United States Patent [19]

Haraikawa

[11] 3,835,970

[45] Sept. 17, 1974

[54] BRAKE CYLINDER ASSEMBLY

[75] Inventor: Tetsuo Haraikawa, Funabashi, Japan

[73] Assignee: Tokico Ltd., Kanagawa-ken, Japan

[22] Filed: Dec. 18, 1972

[21] Appl. No.: 316,400

[52] U.S. Cl............... 188/345, 60/75, 188/72.5, 188/370
[51] Int. Cl............................................. B60f 11/00
[58] Field of Search....... 188/72.5, 106 P, 345, 370; 60/62, 75

[56] References Cited
UNITED STATES PATENTS

| | | | |
|---|---|---|---|
| 3,027,978 | 4/1962 | Peros | 188/72.5 |
| 3,608,678 | 9/1971 | Kobayashi | 188/345 |
| 3,707,210 | 12/1972 | Nyunoya et al | 188/345 |
| 3,731,772 | 5/1973 | Toshida | 188/370 |

*Primary Examiner*—George E. A. Halvosa
*Attorney, Agent, or Firm*—Holman & Stern

[57] ABSTRACT

A brake cylinder unit for a hydraulic brake arrangement having first and second braking systems in which there is provided a single cylinder having at least two pistons slidable therein, with two hydraulically independent pressure chambers provided within the cylinder and defined by the pistons, the pistons are kept in mutual and partially overlapped relationship regardless of service or off-service conditions of the brake cylinder unit and a substantially Z-shaped gap provided between the two pistons when viewed in axial section and in the form of an annular space when viewed in cross section, with such gap serving as one of the hydraulic pressure chambers of the brake cylinder unit.

3 Claims, 5 Drawing Figures

BRAKE CYLINDER ASSEMBLY

This invention relates to improvements in and relating to a brake cylinder unit, especially adapted for automotive use.

A brake cylinder unit is provided, as is commonly known, for each vehicle wheel, so as to cooperate with a master cylinder, regardless of the difference in the style of the brake cylinder unit which may be either of the disc brake type or the drum brake type.

In any style of the brake cylinder unit, it is a requisite requirement to design and arrange the brake piping system extending from the master cylinder to brake cylinder units into the independent dual circuits, in order to guarantee an absolute safety against an accidental breakage or burst of a brake pipe included in the brake piping system. With such dual type brake piping system, it has already been proposed and put into practice a brake cylinder unit having a sole cylinder which is provided with two hydraulically independent pressure chambers.

There is, however, a considerable drawback inherent in the above kind of improved dual brake cylinder unit having a single cylinder and a single piston, in that the unit has an appreciably longer axial cylinder length than the corresponding single type brake cylinder unit.

OBJECTS AND SUMMARY OF THE INVENTION

It is, therefore, a main object of the present invention to provide a dual operation type brake cylinder unit having a substantially equal axial length in comparison with the conventional corresponding single type one having a single cylinder and a single piston slidable therein.

On the other hand, a dual operation type brake cylinder of known design comprises two cylinders and two associated pistons, with said cylinders being united into one unit. A further known dual operation type brake cylinder unit comprises a single cylinder in which a highly complicated stepped piston is housed for sliding movement. These known type brake cylinder units represent, however, a rather great axial length. In addition, this type of brake cylinder unit, if it is of the disc type, for instance, suffers from thermal deformation in the piston and cylinder, especially in their parts which are situated in proximity to the brake disc, whereby the piston is frequently subjected disadvantageously to laterally flexing forces which are highly difficult to counter balance.

It is, therefore, a further object of the present invention to provide a dual operation type brake cylinder unit substantially devoid of the aforementioned kind of thermal deformation and lateral flexing stresses in and between the piston and cylinder. with said stresses being liable to develop on account of the reactive forces transmitted from the brake disc or brake shoes acting in an off-center direction relative to the piston and cylinder.

In order to fulfil the aforementioned object, the brake cylinder unit according to this invention comprises a single cylinder and at least two pistons arranged slidably therein. The pistons and the cylinder are so designed and arranged as to provide two mutually and hydraulically independent pressure chambers having valuable effective volumes. In addition, these pistons are kept in mutually, partially and axially overlapped relationship, regardless of the service or off-service condition of the brake cylinder. There are provided intentional gaps between the two pistons, so as to form a third pressure chamber which has a substantially Z-shaped general configuration when viewed in the axial section of the cylinder and pistons and a ring shape when viewed in the cross section thereof.

The brake cylinder unit according to modified embodiment of the invention comprises a first, a second and third pistons telescopically interrelated one after another. During the operating period of the brake unit, the first piston, on the one hand, and the second and third pistons, on the other, slide relative to each other. The cylinder mounts directly and slidably the first and second pistons, while the third piston is indirectly mounted on and in the cylinder only through the first and second pistons. The first pressure chamber is defined substantially by the first and third pistons and is shaped into a cylindrical chamber which is connected hydraulically with the first brake piping system included in the dual system. The second pressure chamber is defined substantially by the first, second and third pistons and is so shaped as to have a substantially F-form in its axial section and a ring form in its cross-sectional configuration, with said second chamber being fluidically connected with the second brake pipe system included in the dual system. In addition, the related positions of the first and second pistons defining the second pressure chamber are shaped into a stepped configuration. It should be noted that even during the brake application period, the first and second pistons have a considerable overlapping axial length.

As referred to hereinbefore, a ring-shaped pressure chamber is formed by and between at least two pistons, and thus, there are provided thereat gaps sufficient to form said pressure chamber, irrespective of the service or off-service condition of the brake cylinder unit. By adopting this measure, the overall axial length of the unit can be reduced more than otherwise, and further, the disadvantageous lateral flexing forces otherwise encountered can be substantially lessened.

These and further objects, features and advantages of the present invention will become more apparent when read the following detailed description of the invention by reference to the accompanying drawings.

DETAILED DESCRIPTION OF THE INVENTION

Figure 1:
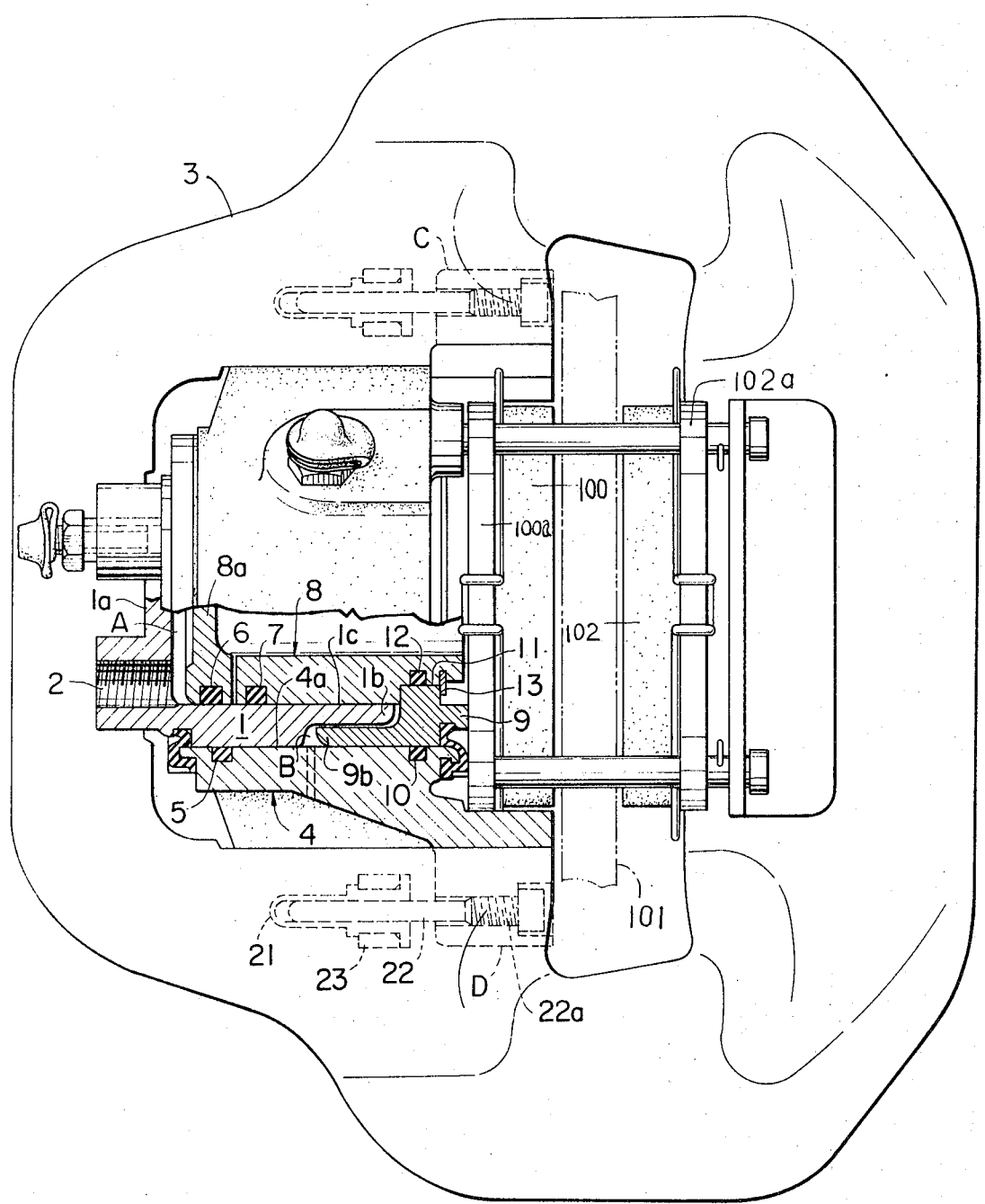
FIG. 1 is a plan view, partially sectioned, of a preferred embodiment of the present invention.

In the drawings, numeral 1 represents a first piston having generally a cup shape. The inner or right hand end of this piston when seen in FIG. 1 has an open end, while the outer or left-hand end thereof is closed by an end wall 1a. At the lower part of the piston end wall 1a, when seen in FIG. 1, a pressure oil inlet part 2, tapped as shown, is axially bored therethrough. This part 2 is hydraulically connected with the related terminal end of a first brake piping, not shown, which leads to a first pressure chamber of a conventional master cylinder, again not shown.

Figure 3:
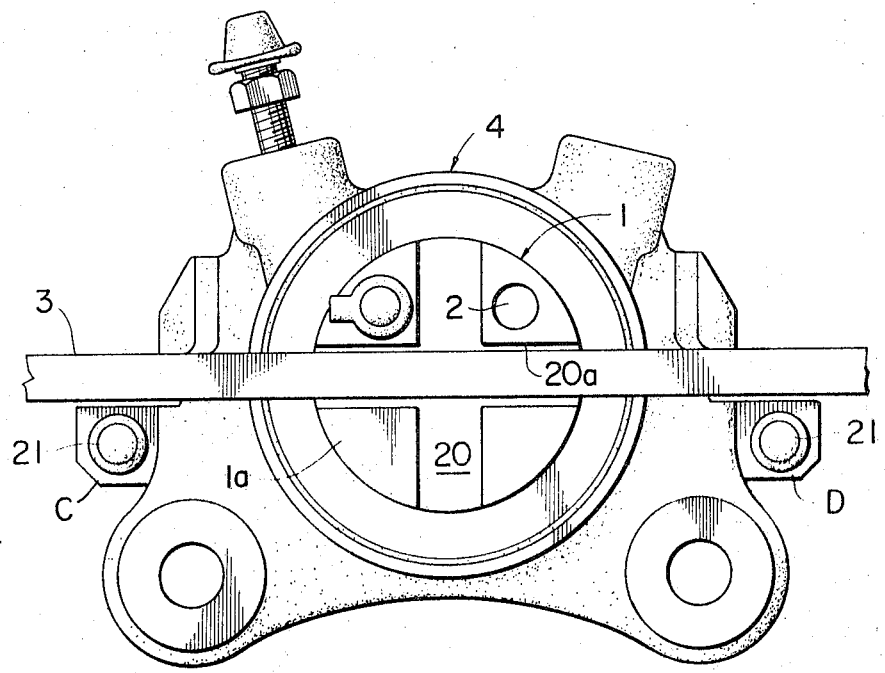
FIG. 3 is an end view thereof.

As best clearly seen in FIG. 3, the outer surface of piston end wall 1a is formed with a large cross groove 20 having a horizontal run 20a which is kept in engagement with a conventional yoke or caliper 3 of a floating type and at its inside edge of the left portion thereof when seen in FIG. 1.

Figure 4:
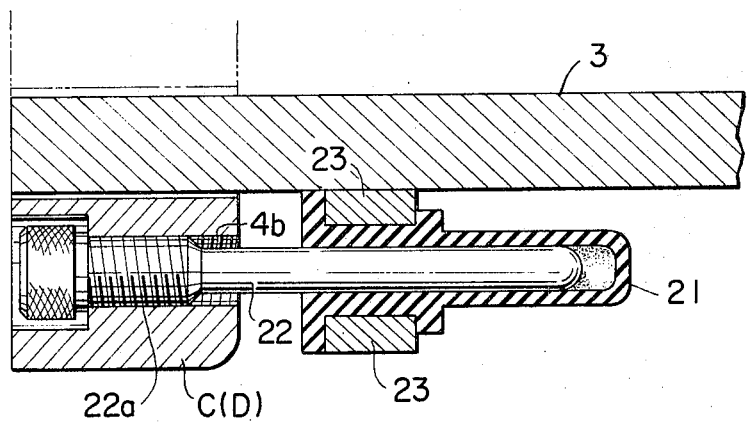
FIG. 4 is an enlarged axial section of a yoke supporter employed.

The yoke 3 is resiliently and slidably mounted on a cylinder body 4, as may be best seen from FIG. 3 and 4.

Yoke supporting devices C and D are arranged at the both sides of cylinder body 4 when seen in FIG. 4. The detailed structure of these supporting devices can be seen from FIG. 4. Since the structure of these supporting devices is the same, the description of the structure will be directed substantially to the device C only. In this device C, a support member 23 is attached rigidly to the yoke by conventional fixing means such as, preferably, welding, although not specifically shown, and a resilient sleeve 21, preferably made of rubber, is attached to the support member 23. A rigid pin 22 is kept in slidable connection with the sleeve 21. The pin 22 has an enlarged and threaded head portion 22a which is kept in threaded engagement with a correspondingly tapped bore 4b formed through a projection at C or D rigid with the cylinder body 4. Due to this resilient and slidable connection, the yoke 3 can be shiftable a certain distance to-and-fro in the horizontal direction in FIG. 4.

The outer cylindrical surface of the first piston 1 is kept in sealed and in slidable contact with an axial bore 4a of the cylinder body 4. For attaining this sealed and slidable connection, a first sealing member 5, preferably in the form of a rubber sealing ring, is provided between the piston and cylinder. This sealing ring is embedded in the inner wall surface of the cylinder, as is conventional. Further, a second, a third, a fourth and a fifth sealing members are provided at 10, 6, 7 and 12. The purpose of these seals will become more apparent as the description proceeds.

Numeral 9 represents a second piston which is shaped into a substantially short and hollow cylinder, as shown. This second piston 9 provides a short and smallest diameter bore portion 11 establishing a substantially loose connection with a third piston 8. The fifth seal 12 serves for the establishment of a sealed connection between the second and third pistons 9 and 8.

The outer cylindrical surface of second piston 9 is kept in sealed and slidable contact with the axial bore 4a of the cylinder body 4 by the provision of said second seal 10.

Inner end portion 1b of first piston 1 and end portion 9b of the second piston 9 are formed into mating steps, but there is provided in practice a small peripheral and axially extending idle gap X between the stepped piston end portions 1b and 9b for allowing liquid to pass therethrough.

The third piston 8 is shaped substantially into a cup, and the outer or left-hand end of the piston when seen in FIG. 1 is closed by an end wall 8a, while the inner or right-hand end has an open configuration as may be appreciated from the foregoing description.

Part of the inside wall surface of bore 1c of the first piston 1, end wall 8a of the third piston 8 slidable thereto and the inner surface of end wall 1a of the first piston 1 defines in combination a first pressure chamber A which is kept in fluid communication with said supply part 2.

The related portions of the first piston 1 and second piston 9 are so formed and arranged to provide a peripheral and axially extending gap, thereby establishing a substantially Z-shaped and peripherally ring-shaped pressure chamber B, irrespective of the service or off-service condition of the brake cylinder unit. The pistons are kept in axially overlapped condition with said idle gap formed therebetween.

During brake application, the mutually related positions of said first and second pistons are so positioned that the inner end of the second piston will occupy an inwardly advanced position shown at P. In this case, the axially overlapped distance is shown at "beta" in FIG. 5 which distance terminates at R corresponding to the inner end of the first piston 1.

Figure 5:
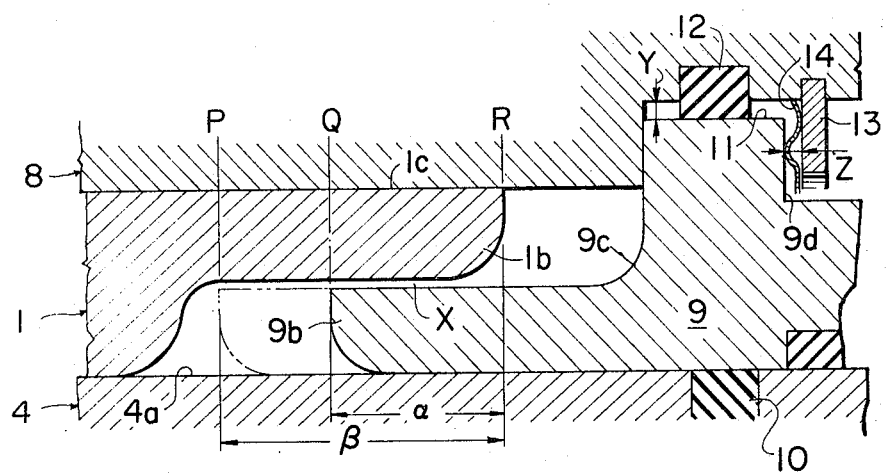
FIG. 5 is an enlarged axial section, illustrative of the mutual relationship among the first, second and third pistons.

During the off-braking period of the brake cylinder unit, the inner end of second piston 9 will be kept at Q in FIG. 5. These pistons represent a shortened overlapped distance "alpha" extending between Q and R.

The relative position of the second and third pistons 9 and 8 will be described by reference to the FIG. 5 hereinbelow.

As was only briefly referred to hereinbefore, there is provided a fifth seal member 12 which is positioned between the axial bore surface 11 of the second piston 9 and the third piston 8 for providing an effective seal therebetween. There is provided a small radial gap Y between the second piston 9 and the third piston 8 extending axially a certain distance. This gap Y may preferably be 0.05–0.3 mm.

The upper and left-hand shoulder end surface 9c of the second piston 9, as shown in FIG. 5, is kept in contact with a corresponding shoulder end surface of third piston 8, while the upper and right-hand shoulder end surface 9d of second piston 9 forms an axial gap Z, preferably 0.05 – 0.3 mm, relative to the left-hand side surface of a clip 13 fixedly attached to third piston 8. The formation of this axial gap Z can be attained by the introduction of a wave undulated washer 14 of a resilient nature between said shoulder surface 9d of the second piston 9 and said rigid and fixed clip 13.

The third piston 8 and second piston 9 can perform not only a relative rotational movement, but also a relative three dimensional off-axial movement to a certain degree, due to the provision of said resilient wave washer 14 and clip 13.

Figure 2:
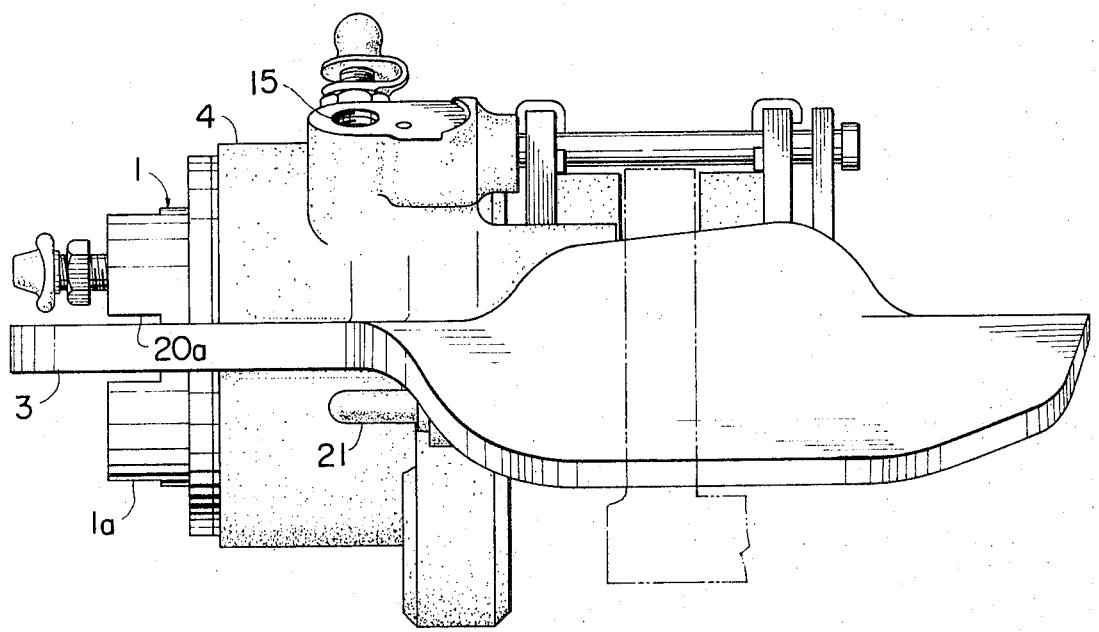
FIG. 2 is a side view thereof.

Second pressure chamber B is defined in combination by cylinder body 4, first to third piston 1, 8 and 9, first seal member 5, second, fourth and fifth seal members 10, 7 and 12, and supply of pressurized oil thereto for execution of the braking operation may be performed through a supply port 15, FIG. 2, formed through cylinder body 4. This port 15 is in the form of a tapped hole which is connected with the terminal end of a second brake piping included in the dual brake piping system, although not shown.

Although not shown, a passage leading to the open atmosphere opens at a certain suitable place positioned between third seal member 6 and fourth seal member 7. The purpose of this escape passage is as follows :

Should either seal 6 or 7 break or leak out, the first or second pressure chamber defined partially thereby which corresponds to the broken seal will be subjected to a pressure reduction. A pressure gauge or the like measuring instrument may be provided to measure the pressure in each of these pressure chambers, so as to visually detect this kind of seal damage or breakage.

The drawings show substantially the off-service or non-braking position of the brake cylinder unit so far shown and described.

In the case of initiation of the braking operation, the vehicle driver depresses a brake pedal, not shown, so as to energize the master cylinder, not shown, thereby two hydraulically independent pressure chambers thereof are pressurized substantially equally. Therefore, pressurized oil is delivered therefrom through the dual brake piping system to the inlet sockets 2 and 15. Thus, the chamber A and B are filled with pressure oil.

In this way, piston 8 and 9 are urged hydraulically to move in unison with each other rightwards in FIG. 1. Braking pressure is conveyed from the piston 9 through a left-hand pad assembly comprising a friction pad 100 and a backing plate 100a to a rotating brake disc 101 which is thus subjected to a frictional braking action.

At the same time, the piston is hydraulically urged to move in the opposite direction, motion being thereby transmitted to the yoke 3 which is thus moved leftwards in FIG. 1.

With this leftward movement of yoke 3, motion is transmitted therefrom to a right-hand side friction pad assembly comprising a friction pad 102 and backing plate 102a. Thus, a braking pressure is applied to the rotating brake disc 101 from its opposite side.

During this braking operation, the yoke 3 is moved leftwards in FIG. 4, carrying the pin 22 fixedly attached thereto. Thus, the thickened part of the resilient sleeve 21 is subjected to elastic deformation for accumulation of a resiliently returning energy. In addition to this returning function, three-dimensional movement and relative rotational movement of several related parts, to be described hereinafter, can be allowed without an invitation to mechanical clogging.

When the driver releases his foot pressure, hydraulic energization of the pressure chambers A and B will naturally disappear, and due to the accumulated return energy in the devices at C and D, all the working parts will be returned automatically in their initial position shown. Thus, the braking forces being applied to the brake disc 101 will be released.

Even when hydraulic pressure as being applied to the first pressure chamber A should fail on account of an accidental pipe break or the like, the brake operation can be realized by virtue of the pressurized contact in the second pressure chamber B, and vice versa.

When the vehicle travels on a long sloped road, frequent and heavy braking operations must be carried out, resulting in a substantially increased temperature of such part of the cylinder body as lying in close proximity to the brake disc or the like friction member of the wheel brake unit, such as, for instance, as high as about 300°C, while the open end part of the cylinder body which is cooled by the flowing ambient air currents may have a relative low temperature such as 50°C. This great temperature difference developed in the brake cylinder unit will invite a thermal deformation of the cylinder body, in addition to the mechanical deformation thereof caused by the braking torque. According to practical experience, lateral flexing forces will develop to a considerable degree to the brake piston which causes heavy friction resistance to relative sliding movement of the mating piston and the cylinder.

However, in the case of the aforementioned embodiment, the second and third pistons may perform a relative three-dimensional movement to a certain degree, in addition to the possibility for performing a relative rotational movement when the occasion develops. By these capabilities and by the shorter axial dimension of the brake cylinder assembly which are attained by the specifically selected triple piston type pistoncylinder unit, conventionally unavoidable biting and clogging of the pistons relative to the cylinder can be effectively avoided.

The embodiments of the invention in which an exclusive property or privilege is claimed are as follows:

1. A brake cylinder unit for a hydraulic brake arrangement having first and second system components, comprising a single cylinder having open ends, a first cup-shaped piston having a closed outer end wall, an inner open end portion and an intermediate portion therebetween, said outer end wall being positioned in close proximity to one open end of said cylinder for providing a movable end wall thereof, said inner end portion being positioned within said cylinder and having its outer diameter smaller than that of the intermediate portion of said piston, a second piston having an inner end portion and an outer end wall, said second piston being slidably mounted within the interior of said cylinder and axially in opposition to said first piston with its inner end portion arranged in an axially overlapped condition with said inner end portion of said piston, with a radial gap being provided between said axially overlapped piston end portions, the outer end wall of said second piston having a bore smaller than the bore of said first piston, a third piston having an end wall and an inner end portion, said third piston being slidably mounted within the first piston and the end wall thereof being positioned within said first piston so that it is rotatable about its own longitudinal axis and slidable therealong, said third piston having an axial length such as to extend beyond the end wall of said second piston, a clip mounted on a cylindrical periphery of said third piston at a position in close proximity to the inner end portion thereof and at a predetermined distance from the inner end portion of said second piston for control of the relative axial position of said second and third pistons, a first pressure chamber having a circular cross section within the interior of said first piston and defined by said first and third pistons, said first piston having a port via which said first pressure chamber is hydraulically connected with said first braking system component, and a second pressure chamber having a substantially Z-shaped longitudinal section and a variable annular cross section, defined by said first, second and third pistons and part of the inner wall of said cylinder, said cylinder having a port through which said second pressure chamber is hydraulically connected to said second braking system component.

2. The brake cylinder unit as claimed in claim 1, including a wave washer located between said clip and said second piston.

3. The brake cylinder unit as claimed in claim 2 in which said first piston is movable axially and mounted in the bore of said cylinder and maintained at its outwardly and axially extending portion from the bore of the cylinder in axial engagement by its closed outer end wall with a yoke mounting a first friction pad at one side of a rotatable brake disc and said second piston being maintained at its inner end portion with a second friction pad mounted slidable relative to the cylinder at the opposite side of the brake disc.

* * * * *